Figure 3:
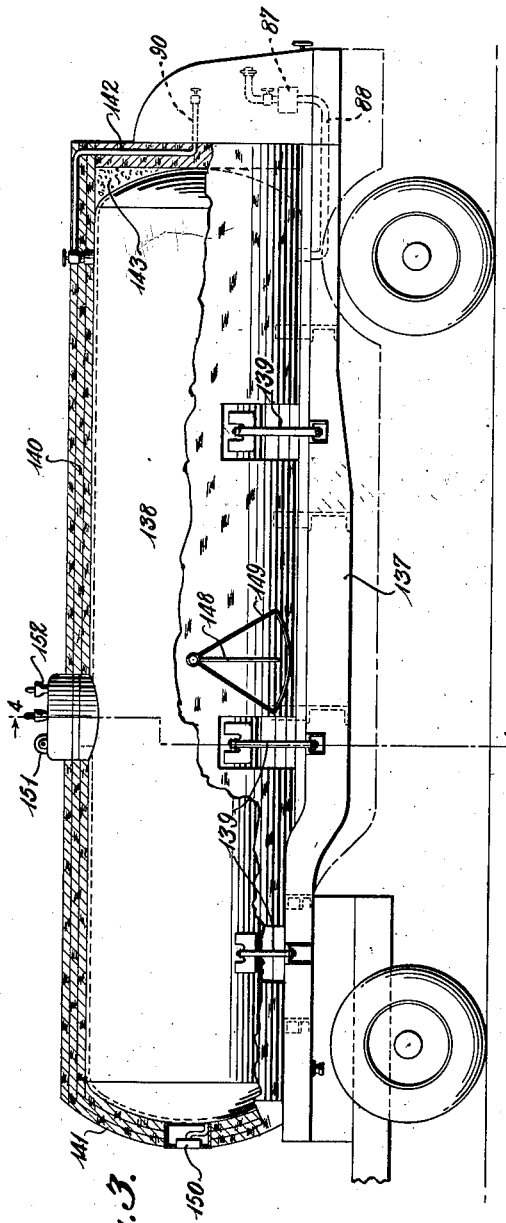

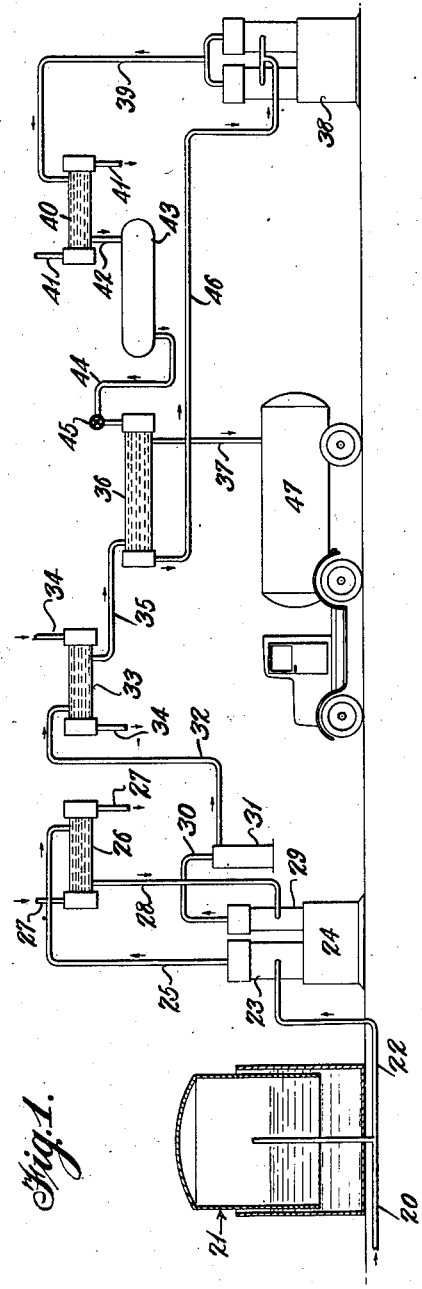

Nov. 14, 1939.　　　　E. GEERTZ ET AL　　　　2,180,231
METHOD AND APPARATUS FOR PRODUCING, TRANSPORTING, STORING,
AND/OR HANDLING LIQUID CARBON DIOXIDE
Filed May 20, 1938　　　　7 Sheets-Sheet 2

Inventors
Eric Geertz and
Jesse E. Taylor
By L. Donald Myers
Attorney

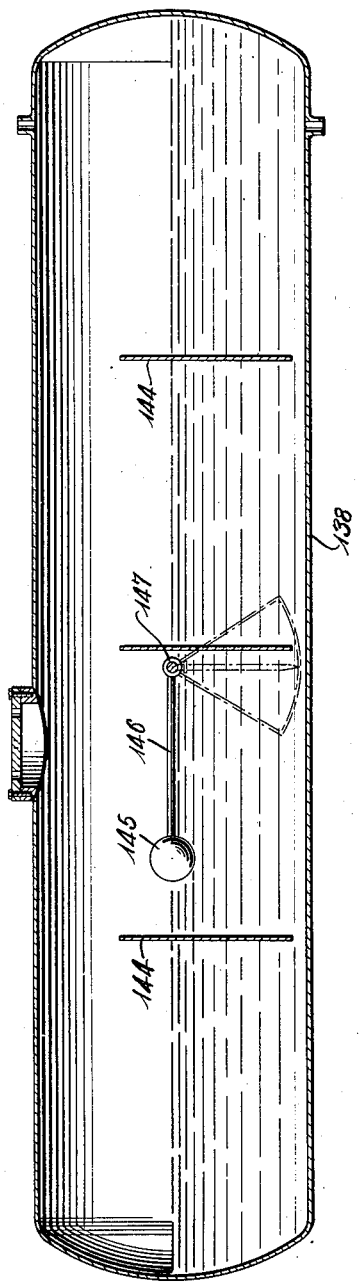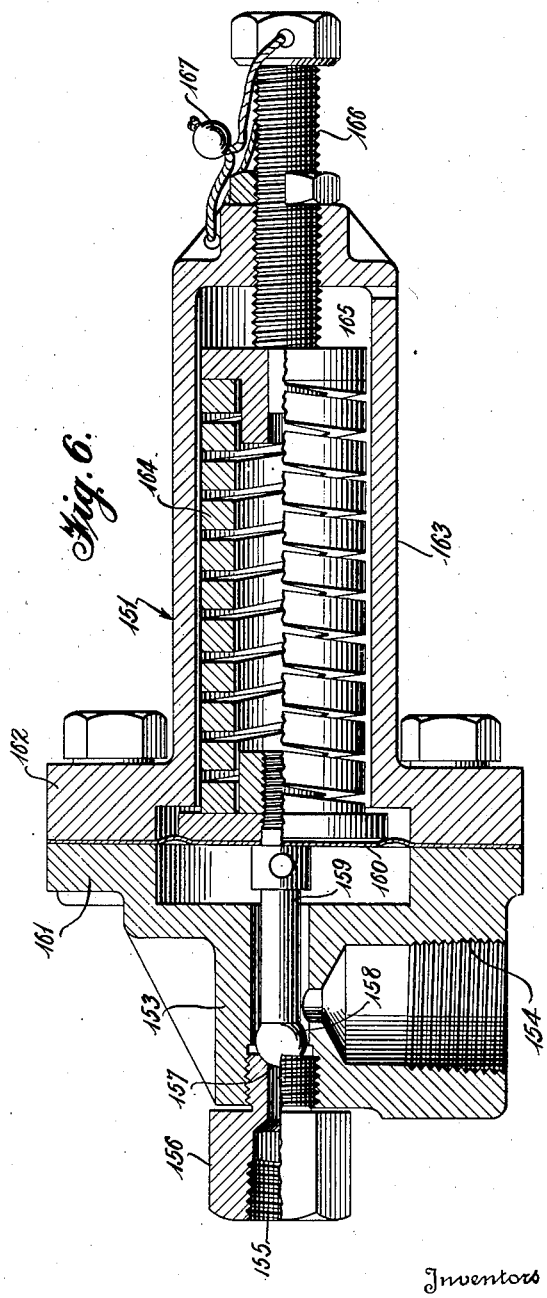

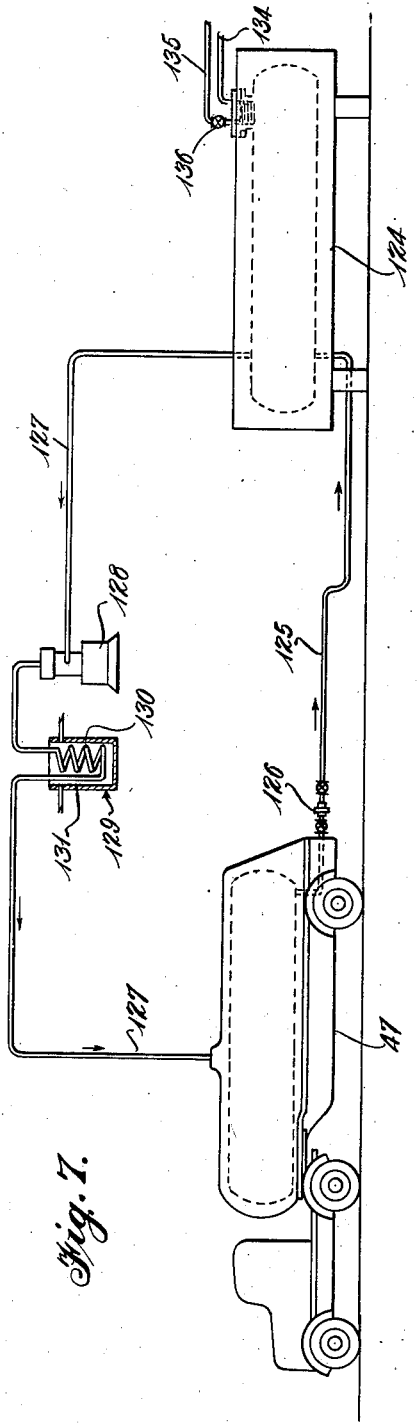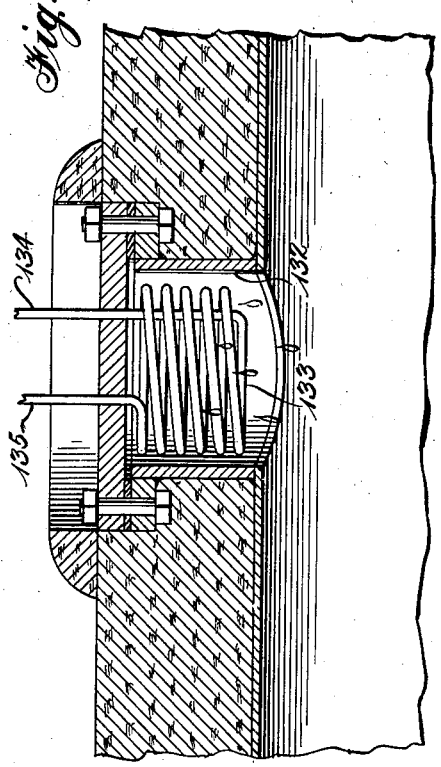

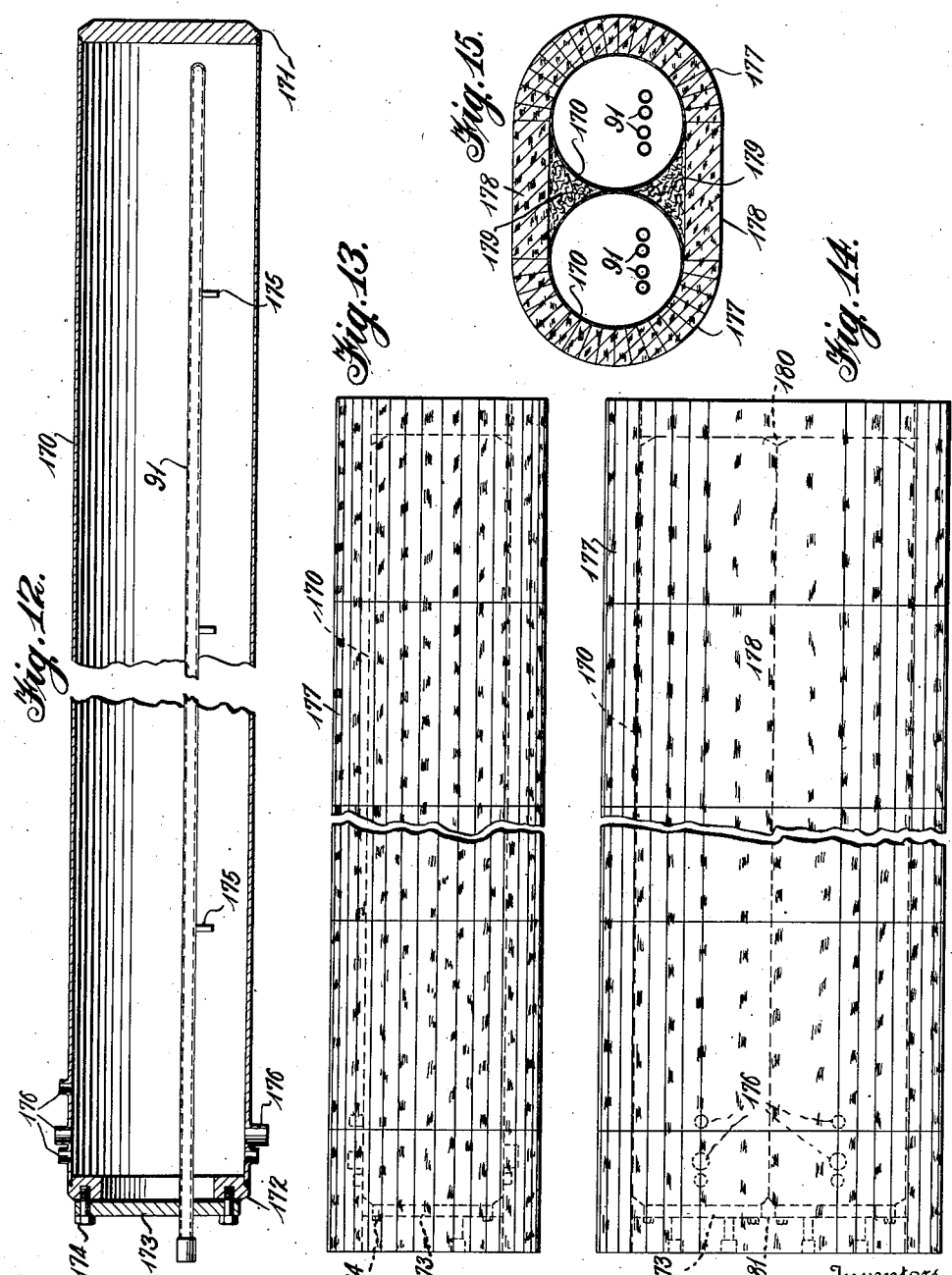

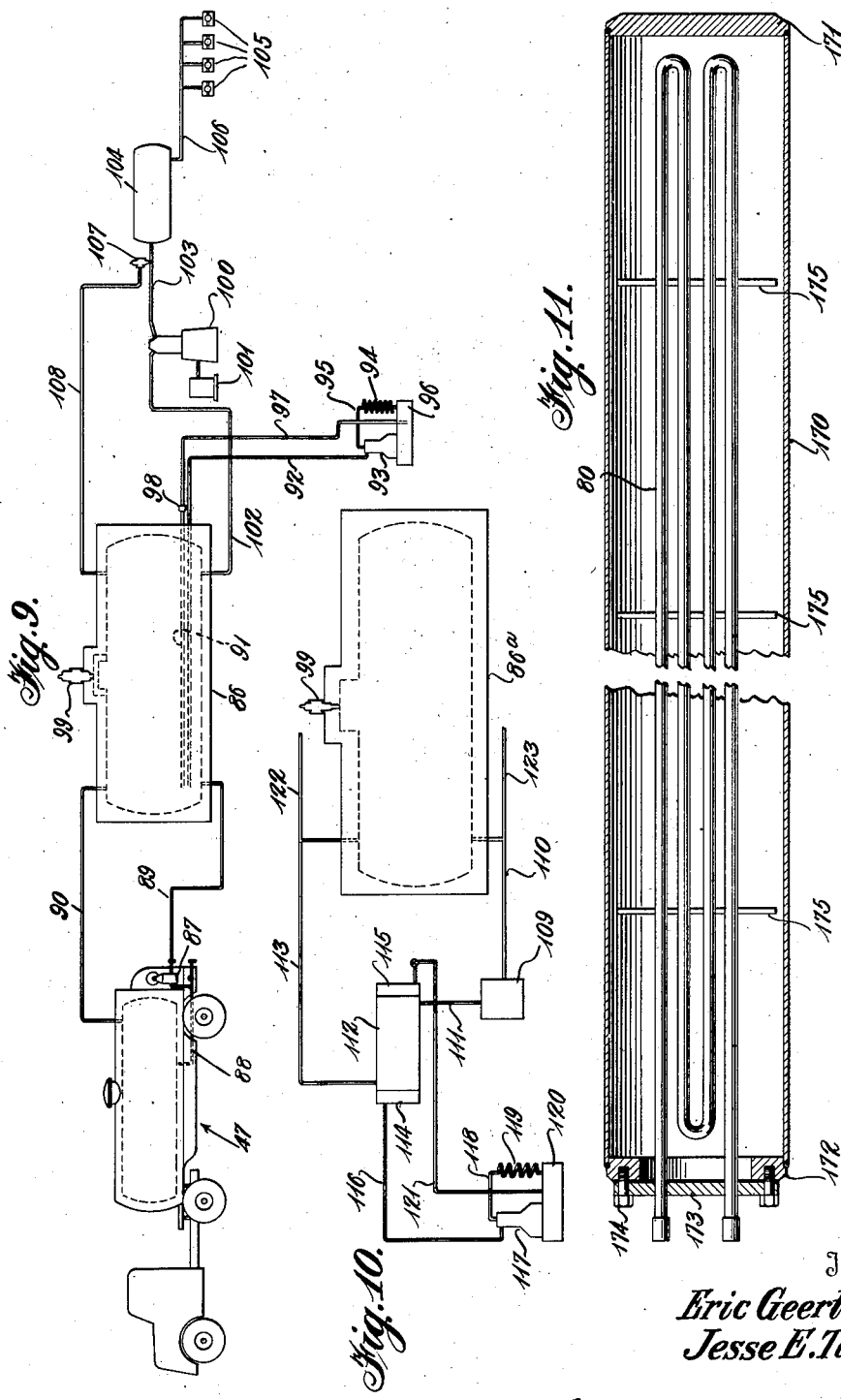

Inventors
Eric Geertz and
Jesse E. Taylor

Patented Nov. 14, 1939

2,180,231

UNITED STATES PATENT OFFICE 2,180,231

METHOD AND APPARATUS FOR PRODUCING, TRANSPORTING, STORING, AND/OR HANDLING LIQUID CARBON DIOXIDE

Eric Geertz, Aurora, and Jesse E. Taylor, Elgin, Ill., assignors to Cardox Corporation, Chicago, Ill., a corporation of Illinois Application May 20, 1938, Serial No. 209,152

17 Claims. (Cl. 62—1)

This invention relates to new and useful improvements in methods and apparatus for producing, transporting, storing and/or handling liquid carbon dioxide.

The primary object of this invention is to provide methods and apparatus for producing, transporting, storing, transferring and using liquid carbon dioxide at a much lower temperature and corresponding vapor pressure than heretofore employed, whereby less expensive equipment may be utilized and a material reduction in operating expenses may be brought about.

A further important object of this invention is to provide methods and apparatus for delivering extremely low temperature and corresponding low pressure liquid carbon dioxide to a transport or stationary storage container; for transferring said liquid carbon dioxide from one type of storage container to the other; for preserving or maintaining said low temperature and corresponding vapor pressure while the liquid carbon dioxide is thus stored, and for withdrawing the liquid carbon dioxide for use when and as desired.

Another object of the invention is to provide apparatus for storing liquid carbon dioxide at a constant low temperature and corresponding vapor pressure indefinitely without loss and at a very low cost.

A still further object of the invention is to provide apparatus for charging comparatively small containers or cylinders from a storage container of the above mentioned type with a comparatively low consumption of power for the charging operation.

A further object of the invention is to provide apparatus for handling liquid carbon dioxide in which maintenance costs resulting from leakage at joints is virtually eliminated.

Still another object of the invention is to provide methods and apparatus for producing low temperature and corresponding low pressure carbon dioxide and charging the same into either transport or stationary containers.

Another object of the invention is to provide equipment in which the low temperature and corresponding low pressure carbon dioxide may be transported, stored, and otherwise handled with greater safety than attended the use of previous high pressure storing and handling equipment.

Other objects and advantages of the invention will be apparent during the course of the following description.

Figure 4:
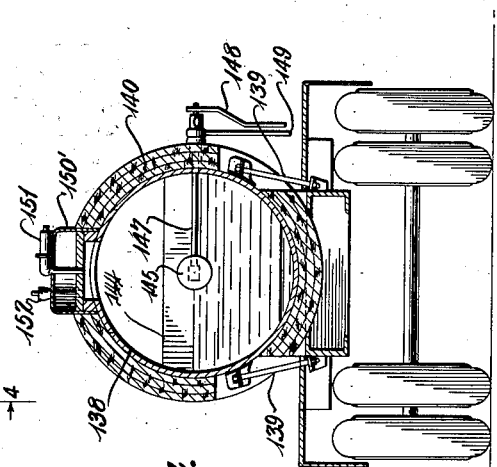
Figure 16:
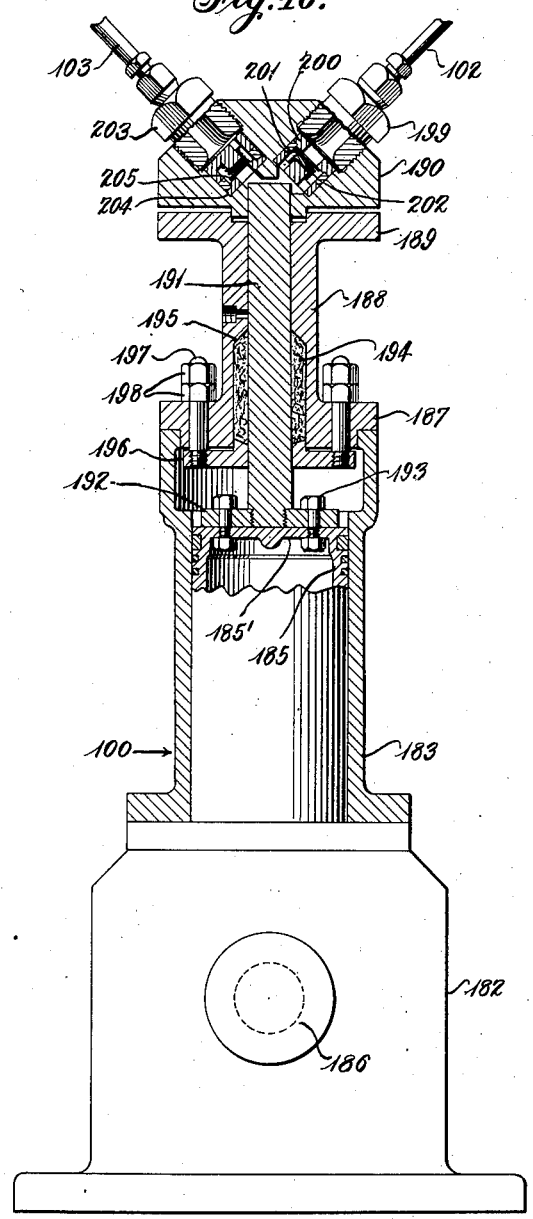
Figure 17:
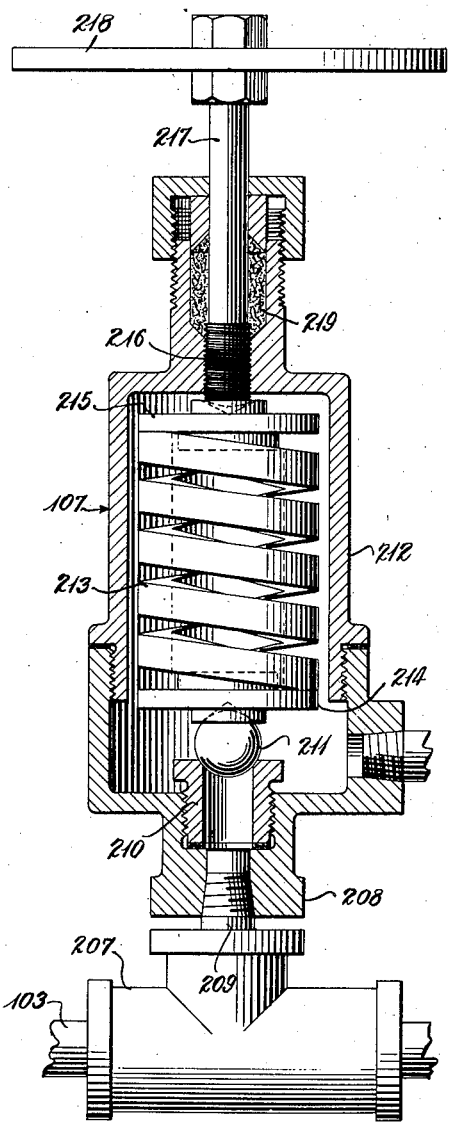

In the accompanying drawings forming a part of this specification and in which like numerals are employed to designate like parts throughout the same, Figure 1 is a schematic view illustrating one form of method or apparatus embodying this invention for converting carbon dioxide gas into liquid carbon dioxide having a low temperature and corresponding vapor pressure and charging the said liquid carbon dioxide into either a transport or stationary storage container, Figure 2 is a similar view to Fig. 1, but illustrates a modified form of method and apparatus for accomplishing the same results, Figure 3 is a partial side elevational view and partial longitudinal sectional view of a transport type of equipment by means of which the low temperature, low pressure liquid carbon dioxide may be carried between points of storage, or the like, Figure 4 is a vertical sectional view taken on line 4—4 of Fig. 3, Figure 5 is a detail longitudinal or vertical sectional view of the storage container per se employed in the transport unit disclosed in Figs. 3 and 4, Figure 6 is a detail longitudinal sectional view of a form of pop-off or relief valve which may be employed in connection with the transport unit disclosed in Figs. 3 and 4, Figure 7 is a schematic view illustrating a transport container and a stationary storage container with mechanism which may be employed for transferring low temperature, low pressure liquid carbon dioxide from the transport container to the stationary storage container, Figure 8 is a detail sectional view illustrating a cooling coil which is associated with the stationary storage container disclosed in Fig. 7, Figure 9 is a schematic view disclosing a storage and charging plant designed particularly for use in handling extremely low pressure and low temperature liquid carbon dioxide at a distribution point, Figure 10 is a schematic view illustrating a modified form of apparatus for maintaining liquid carbon dioxide stored in a container refrigerated to a desired low temperature and corresponding low pressure, Figure 11 is a horizontal, longitudinal sectional view of a form of storage container structure embodying this invention, Figure 12 is a longitudinal vertical sectional view of the storage container structure disclosed in Fig. 11, Figure 13 is a side elevational view of a storage container assembly with insulating material applied thereto, Figure 14 is a top plan view of the assembly shown in Fig. 13, Figure 15 is a transverse sectional view of the assembly shown in Figs. 13 and 14, Figure 16 is a detail view partly in end elevation and partly in vertical section of a reciprocating plunger type of compressor which is employed as a liquid pump for pumping and compressing low temperature, low pressure liquid carbon dioxide, and Figure 17 is a longitudinal sectional view of a type of pop-off or relief valve structure employed for limiting the development of hydrostatic pressure in a portion of the system disclosed in Fig. 9.

It has been the practice to commercially handle carbon dioxide during transportation and storage as well as when used either in its liquid phase at the varying temperatures of the surrounding atmosphere and the vapor pressures normal to such temperatures or as solid carbon dioxide which is usually referred to as "dry ice." Liquid carbon dioxide at such surrounding atmospheric temperatures will have a vapor pressure usually in excess of 1000 pounds per square inch, absolute. If the liquid carbon dioxide is confined in a container which is subjected to hot summer temperatures, the vapor pressure may rise as high as 2000 pounds per square inch, absolute. The equipment which must be employed for transporting, storing and otherwise handling liquid carbon dioxide at such surrounding atmospheric temperatures and the corresponding excessive vapor pressures, naturally, is expensive to acquire, install and maintain, and some hazard is involved in confining the material in containers at indeterminate and fluctuating temperatures.

When carbon dioxide is transported, stored and otherwise handled in its solid or "dry ice" state, the rate of loss, due to sublimation, is comparatively high and it also involves the steps of first converting the carbon dioxide to its solid state and then reconverting it to its liquid or gaseous state, if the carbon dioxide is not to be used in its solid form.

It has been discovered that material savings in equipment and maintenance costs may be obtained by transporting, storing, and otherwise handling carbon dioxide in a liquid state when refrigerated to certain temperatures falling considerably below an atmospheric temperature of 70° F.

One of the principal items of equipment embodying this invention which result in a material saving in handling costs are the containers in which the unusually low pressure, low temperature liquid carbon dioxide is transported and stored. Containers capable of handling liquid carbon dioxide at the high vapor pressures resulting from maintaining the liquid at the surrounding atmospheric temperatures usually cost purchasers from $450.00 to $600.00 per ton of carbon dioxide capacity, depending upon the capacity of each container and the number of containers purchased at any one time. The present invention contemplates the use of insulated containers with mechanism capable of maintaining the liquid carbon dioxide at the desired low temperature and corresponding vapor pressure. Equipment of this character can be supplied for approximately $275.00 per ton of carbon dioxide.

Hereinafter the expression "sub-atmospheric temperature" is used repeatedly in the specification and claims. The meaning to be applied to this expression is based on the frequent use of the expression "atmospheric temperature" as designating 70° F. "Sub-atmospheric temperature", therefore, means a temperature below 70° F.

The handling of liquid carbon dioxide, including such operations as transferring the carbon dioxide between different containers, at pressures corresponding to the selected sub-atmospheric temperatures, effects a material saving in the character of pumping equipment employed, the power consumed to operate the pumping equipment, joint maintenance, and the like, when compared to handling this commodity at the surrounding atmospheric temperatures and their corresponding high vapor pressures. It has been determined that a power saving of approximately 75% may be obtained in the operation of charging plants for small cylinders or shells when the liquid carbon dioxide is handled at a low temperature falling within the range of sub-atmospheric temperatures selected. It also has been determined that the cost of maintaining joints properly sealed is virtually eliminated.

In considering the entire system of handling and using liquid carbon dioxide at the selected sub-atmospheric temperatures and their corresponding vapor pressures involving this invention, it is found to involve first the conversion of carbon dioxide gas at the generating plant, or at other sources of supply, to the liquid phase and to the desired sub-atmospheric temperature and its corresponding vapor pressure at which it is to be subsequently handled. Carbon dioxide, of course, may be handled as a liquid at any temperature ranging from approximately 87° F. to approximately −70° F. and the vapor pressures which will prevail at these extreme limits will be 1066 pounds per square inch and 75 pounds per square inch, respectively. At a temperature of 32° F., the corresponding vapor pressure is approximately 505 pounds per square inch which, when maintained constant, will provide a reasonably satisfactory maximum working pressure for the type of equipment and methods of handling which may be successfully employed in carrying out this invention. Of course, the selection of still lower temperatures will result in increased economy and safety in the handling and use of liquid carbon dioxide because such lowered temperatures naturally will be accompanied by lower vapor pressures. Therefore, probably the temperatures which will be most frequently selected will fall within the more limited range of from 0° F. to −40° F. which will provide working pressures for the equipment of from approximately 300 pounds per square inch to approximately 150 pounds per square inch. It is not difficult to appreciate the advantages and material savings which will result from these appreciable reductions in working pressures.

Secondly, the system involves the storage of the liquid carbon dioxide at the locations where it is produced and at the several points of distribution for the system. Of course, the liquid carbon dioxide must be stored and maintained at the selected sub-atmospheric temperature or temperatures and its corresponding vapor pressures.

Thirdly, the system involves transportation of of the liquid carbon dioxide from the plant at which it is produced to the various points of distribution while maintaining the said liquid at a desired constant sub-atmospheric temperature and its corresponding vapor pressure.

Fourthly, the system involves transferring the low temperature, low pressure liquid carbon dioxide between the transportation containers and the stationary storage containers which are located at strategic points of distribution relative to the territories being served by the system. This transferring, of course, must be accomplished without rise in temperature and pressure of the liquid carbon dioxide while being handled, and Fifthly, the carbon dioxide usually will be made available for use by being placed in small cartridges, cylinders, drums, or the like, in which the carbon dioxide will be confined at the surrounding atmospheric temperatures and the system involves the charging of these small containers from the large capacity storage containers in which the carbon dioxide is confined at the selected sub-atmospheric temperature and its corresponding vapor pressure.

In the drawings, wherein for the purpose of illustration are shown the preferred embodiments of this invention, and referring particularly to Fig. 1, there is disclosed the equipment of a plant which is suitable for use in converting the carbon dioxide gas or vapor, resulting from storing the carbon dioxide at atmospheric temperatures, to liquid at a selected sub-atmospheric temperature and its corresponding vapor pressure. The carbon dioxide delivered by the producing plant is fed through the pipe 20 into a conventional form of gas holder or receiver 21. This holder or receiver is of conventional construction and needs no further explanation.

From the gas holder 21, the carbon dioxide gas is drawn off by means of the pipe 22 and is delivered to the low pressure or first stage cylinder 23 of a two stage compressor 24. From this low pressure or first stage cylinder, the carbon dioxide gas is conducted by the pipe 25 to the heat exchange zone 26 of the first stage intercooler which is in circuit with the cooling water lines 27. From the intercooler, the lower temperature carbon dioxide gas is conducted by the pipe 28 to the second stage or high pressure cylinder 29 of the said two stage compressor 24. From the outlet of this second cylinder 29, the highly compressed carbon dioxide gas is conducted by the pipe 30 to an oil trap 31. Leading from the said oil trap is a pipe 32 which conducts the carbon dioxide gas to a second stage cooler through the heat exchange zone 33 of which the carbon dioxide gas passes. This cooler has circulated therethrough the cooling water by means of the lines 34.

Merely for the purpose of illustrating one set of operating conditions for the two stages of compression and cooling, but without intending to limit the operation of this equipment to any particular values or range of values, it will be explained that the first stage of compression, performed by the cylinder 23, may result in delivering the carbon dioxide gas at a pressure of 70 pounds per square inch. After being cooled in the first stage intercooler for the purpose of removing the heat absorbed during compressing, the gas is further compressed in the second stage cylinder 29 and delivered at a pressure of 300 pounds per square inch to the second heat exchange unit. From this unit the carbon dioxide gas may be delivered at a pressure of 300 pounds per square inch and at 70° F. As stated, these values are given by way of example only and may be varied as desired.

For the purpose of converting the carbon dioxide gas to a liquid at a sub-atmospheric temperature and its corresponding vapor pressure, the gas is led from the second cooler 33 by means of a pipe 35 to a condenser 36. This condenser may be of a character to deliver liquid carbon dioxide therefrom at a temperature of, for example, —5° F. with a corresponding vapor pressure of 280 pounds per square inch through the discharge line 37.

To bring about this conversion and cooling of the carbon dioxide, the condenser 36 is connected in circuit with a suitable commercial refrigerating system or plant. This plant may include an ammonia compressor 38 which discharges its ammonia gas through the line 39 to an ammonia condenser 40. This ammonia condenser has cooling water circulated therethrough by means of the pipe lines 41. The condensed or liquefied ammonia is discharged from the condenser 40 through the pipe 42 into the receiver 43 from which it discharges through the pipe line 44 and by the expansion valve 45 to the aforementioned condenser 36. The return line for the ammonia consists of the pipe 46 which extends from the condenser 36 back to the ammonia compressor 38.

The low temperature, low pressure liquid carbon dioxide may be discharged through the condenser outlet pipe 37 directly into a transport unit 47 if desired. It will be appreciated, however, that the discharge through the pipe 37 may be into a stationary storage container if desired, and then transport containers may be charged from the storage container. After the charging of a transport container 47 with the low temperature, low pressure liquid carbon dioxide, this container is moved to any one of the several distribution points where the said liquid carbon dioxide is delivered to a stationary storage container from which it is eventually drawn off for use.

In Fig. 2, there is disclosed a plant layout which may be employed for obtaining the low temperature, low pressure liquid carbon dioxide. This plant differs from the plant illustrated in Fig. 1 primarily because of the substitution of a third stage of compression for the ammonia refrigerating plant of Fig. 1. The layout or equipment of Fig. 1 is preferred over that of Fig. 2 because it has been determined that the ammonia compressor 38 may be operated at a lower consumption of power than that required for the third stage of compression. The equipment disclosed in Fig. 2 now will be explained.

A conventional gas holder 48 is provided for receiving the gas from the producing plant by means of the pipe line 49. The carbon dioxide gas is drawn off from the holder 48 through the pipe line 50 and is fed to the first stage of compression; i. e., the cylinder 51, of the three stage compressor 52. From the outlet of this first stage cylinder 51, the carbon dioxide gas is conducted by the pipe 53 to an oil trap 54 and then to the heat exchange zone 55 of a first stage intercooler by means of the pipe line 56. This first stage intercooler is supplied with cooling water by means of the pipe lines 57. From this cooler, the carbon dioxide gas at, for example, 70 pounds per square inch, is conducted by the pipe 58 to the intake of the second stage of compression, or the cylinder 59. From the outlet of this second stage cylinder, the carbon dioxide gas at, for example, 300 pounds per square inch, is conducted by the pipe 60 to an oil trap 61 and from this oil trap by the pipe 62 to the heat exchange zone of a second stage intercooler 63. This second stage intercooler is provided with cooling water by means of the pipe lines 64. The carbon dioxide gas at the said 300 pounds per square inch pressure is led by the pipe 65 to the third stage cylinder 66. From the outlet for the cylinder 66 of the third stage of compression, the carbon dioxide gas at, for example, 1000 pounds per square inch pressure is conducted by the pipe 67 to the heat exchange zone 68 of the third stage aftercooler. This third stage heat exchange unit is supplied with cooling liquid, such as water, by means of the pipe lines 69.

The gas leaving the third stage aftercooler passes through the pipe line 70 to the oil trap 71 and from this trap to a drier 72 through a pipe line 73. A condenser 74 receives the carbon dioxide gas from the drier 72 as it passes through the pipe line 75. A suitable liquid to effect condensation of the carbon dioxide gas is fed through the condenser 74 by means of the pipe lines 76. The liquid carbon dioxide leaves the condenser 74 and passes into the liquid carbon dioxide receiver 77 by passing through the pipe line 78. The liquid carbon dioxide in the receiver 77 is at a pressure of, for example, 1000 pounds per square inch with a temperature of, for example, 70° F.

A properly insulated storage container 79 is provided to receive the liquid carbon dioxide. The said liquid carbon dioxide is to be stored in this container at a selected low temperature and corresponding low vapor pressure. We may select the temperature and pressure values referred to in connection with the disclosure of Fig. 1; i. e., a temperature of —5° F. and a corresponding vapor pressure of 280 pounds per square inch. The carbon dioxide stored in the container 79 is maintained at the desired sub-atmospheric temperature by means of a refrigerating coil 80 which is connected to a comparatively small refrigerating plant. It is to be understood that the capacity of this refrigerating plant need only be sufficient to take care of the absorption of heat which occurs through the insulation 81 which surrounds the said tank.

The liquid carbon dioxide receiver 77 is connected by a pipe 82 to the lower portion of the storage container 79 and an expansion or pressure reducing valve 83 is located in this pipe line 82. The dome or top of the storage container 79 is connected to a carbon dioxide vapor or gas line 84 which is provided with an adjustable valve 85 and is illustrated as being connected to the intake line 65 of the cylinder for the third stage of compression. It will be understood, however, that this line may be connected with the intake line 58 for the cylinder of the second stage of compression, if desired. This gas or vapor line 84 is connected with the intake for the third stage of compression if the selected storage pressure for the container 79 is higher than the second stage intake pressure. If the selected vapor pressure for the storage container 79 is lower than the third stage intake pressure, the gas or vapor line 84 then is connected to the gas intake line 58 for the cylinder 59 of the second stage of compression.

It will be appreciated that as the liquid carbon dioxide, which is at 1000 pounds per square inch pressure and 70° F., passes through the expansion or pressure reducing valve 83, the pressure of the liquid carbon dioxide drops to the storage pressure of the container 79. This expansion of the liquid carbon dioxide as it passes through the valve 83 is accompanied by partial vaporization and the heat of vaporization results in lowering the temperature of the liquid carbon dioxide being discharged into the container 79. The valve 85 in the carbon dioxide gas or vapor line 84 is adjusted to maintain a constant pressure in the storage container 79. When this valve 85 is so adjusted, the quantity of gas returning to the compressor cylinder 66 or 59 will equal the quantity of carbon dioxide which vaporizes when passing through the expansion valve 83 on its way from the receiver 77 to the storage container 79.

There now have been disclosed two different types of plants or equipment which may be employed for making available the low temperature and corresponding low pressure liquid carbon dioxide for handling by the remainder of the system. It has been seen that the low temperature, low pressure liquid carbon dioxide may be charged into either a storage container or the container of a transport vehicle. The charging of a transport vehicle is for the purpose of carrying the low temperature, low pressure liquid carbon dioxide to a storage container which is located at a distribution point strategically placed with respect to the territory or territories to be served by said distribution point.

Referring particularly to Fig. 9, there is disclosed a plant installation which is particularly adapted for use as equipment at a distribution point. The liquid carbon dioxide is to be charged into small cylinders, cartridges or drums by means of this installation so that the liquid carbon dioxide may be dispensed for use. This plant includes a storage container assembly of large capacity which is designated in its entirety by the reference character 86. This storage container assembly may consist of one or more individual containers or tanks with suitable insulating material arranged to completely surround the assembly. The construction of the individual tanks or containers and the enclosing insulating material will be described in detail in connection with other figures.

This installation of Fig. 9 is adapted for use as a distributing plant which is located at a remote point with respect to the source of supply of low temperature, low pressure liquid carbon dioxide; i. e., either the plant disclosed in Fig. 1 or that disclosed in Fig. 2. The liquid carbon dioxide, therefore, must be transported to the stationary storage unit 86. As the liquid carbon dioxide is to be stored in this unit 86 at a selected, constant sub-atmospheric temperature and its corresponding vapor pressure, the liquid carbon dioxide should be delivered to the container unit at the selected temperature and pressure. The transportation unit, therefore, should be of a character which is capable of delivering the liquid carbon dioxide to the storage container assembly 86 in approximately the desired pressure-temperature condition. Fig. 1 discloses a transportation unit 47 coupled with the discharge of the installation receiving its quota of low pressure, low temperature liquid carbon dioxide. The installation disclosed in Fig. 9 is shown with its storage container assembly 86 connected with a transport unit 47 for receiving low temperature, low pressure liquid carbon dioxide from said transport unit.

To effect transfer of the low temperature, low pressure liquid carbon dioxide from the storage space of the transportation unit to the container or containers of the assembly 86, a suitably driven centrifugal, rotary or reciprocating liquid pump 87 is employed. The suction side of this pump is connected by a pipe line 88 to the storage space of the transport unit 47. The discharge side of the pump 87 is suitably connected to the permanently installed pipe line 89 which communicates with the individual container or containers of the storage assembly 86. If the type of pump 87 which is employed is not capable of building up very much pressure difference between its suction and discharge sides, when pumping a low viscosity liquid such as carbon dioxide, it is necessary to equalize the pressures in the storage spaces of the two units 47 and 86. This may be accomplished by means of a temporary connection or pipe line 90 which extends between the upper regions of the said storage spaces of the two containers. With this arrangement, carbon dioxide gas will be permitted to pass from the storage container or containers 86 to the container of the transport unit 47 as liquid is transferred from the unit 47 to the container or containers 86 by means of the pump 87. This prevents a rise in pressure in the storage container or containers. At the end of the transfer operation, all of the liquid is in the storage container or containers 86 and the container of the transport unit 47 is full of gas.

A typical storage container assembly 86 may have a normal working pressure of approximately 300 pounds per square inch for which the corresponding temperature of the carbon dioxide will be approximately 0° F. Such a normal working pressure, of course, will be suitable for handling liquid carbon dioxide at a temperature and a corresponding vapor pressure of the value specifically referred to in connection with the illustrated plants of Figs. 1 and 2. The individual containers of a low pressure storage assembly are designed for a maximum working pressure corresponding to the pressure at which the system will be operated. In this manner, the savings in weight and cost of the equipment are obtained. It is necessary to prevent increase in the pressure of the carbon dioxide stored in the containers of the assembly 86 and, therefore, it is necessary to remove any heat which penetrates the insulation surrounding these containers. Inasmuch as the carbon dioxide is charged into the containers at the temperature-pressure condition maintained within the storage containers, the means for removing heat from within the containers need only have a capacity sufficient to take care of the heat losses through the insulation. This desired result may be accomplished by equipping each one of the individual containers with an evaporator coil 91. Each coil is connected by the pipe 92 with the compressor 93 of a standard commercial refrigerating unit which is permanently installed adjacent the storage unit 86. An air cooled condenser coil 94 for this refrigerating unit is connected at one end to the compressor 93 by means of the pipe 95. The remaining end of the coil 94 is connected to a refrigerant receiver 96. A pipe 97 extends from the receiver 96 to the evaporator coil 91 of the storage container 86. An expansion valve 98, of standard commercial construction, is arranged in the inlet line leading to the evaporator coils 91 of the individual containers. This valve and the remainder of the refrigerating mechanism will operate in the usual way to effect refrigeration of the contents of the storage containers for the unit 86 and at a rate which, preferably, will remove heat from the interior of the unit 86 at least equal to the maximum rate of heat input. This refrigerating step may be accomplished at a very low cost and will retain the liquid carbon dioxide in the storage containers for an indefinite period without any loss due to vaporization.

As a precautionary step, taken to prevent damage to the equipment or personal injury in the event of failure of the refrigerating unit, one or more blow-off or pop-off valves 99 may be provided for each of the individual storage containers. If one such pop-off valve is employed for each container, it may be set to start bleeding off the carbon dioxide gas at the maximum allowable working pressure of the storage container. If a plurality of safety valves are used, the additional valves may be set to start bleeding off carbon dioxide gas at successively higher pressures with the result that each succeeding valve acts as a safety device for and will operate in the event of failure of the preceding valve. The successively operating valves, therefore, are employed or provided solely for the purpose of taking care of the situation which would arise as a result of failure of one or more of the series of valves. Of course, other well known forms of pressure relief devices might be used in place of pressure operated valves.

As suggested, the first safety valve may be set to operate at the maximum working pressure of the storage container. As gas bleeds off through the pressure operated valve, the contents of the storage tank are cooled by the refrigerating effect of the evaporation of carbon dioxide liquid within the tank. This results in a drop in temperature and consequently a drop in pressure within the container, thus causing the blow-off valve to close. The quantity of liquid carbon dioxide which would bleed off through the pressure relief valve in the event of failure of the refrigeration system can be calculated since it would be the ratio of the heat loss in B. t. u. per hour to the latent heat of carbon dioxide at the stored temperature. For example, at 0° F., the latent heat is 120 B. t. u. per pound. A typical storage unit of approximately 8 tons liquid carbon dioxide capacity has a rate of heat penetration through the insulation of approximately 1200 B. t. u. per hour. Thus, the gas loss involved in maintaining the low pressure in the event of failure of the refrigeration unit would be a ratio of 1200:120, or approximately 10 pounds per hour. The loss in this typical case amounts to approximately 1½% in each 24 hours. This loss is less than the sublimation loss usually encountered in storing and handling solid carbon dioxide in the form of "dry ice."

It will be understood that the rate of heat penetration through the insulation is a function of the temperature differences between the tank contents and the exterior surface; of the total exterior area, and of the thickness and efficiency of the insulating material. It is possible, therefore, to limit the maximum rate of input by proper design of the insulating jacket.

It has been determined that it is possible to charge the storage containers at temperatures and pressures lower than the maximum allowable working pressure of the system. In this manner, the liquid can be stored for an appreciable length of time without requiring the refrigeration machine to operate. The refrigeration unit may be caused to operate in response to a pressure control mechanism which will function when a predetermined pressure, somewhat below the maximum allowable working pressure, is attained. As an illustration, liquid carbon dioxide may be charged into the typical storage container referred to above at a pressure of approximately 200 pounds per square inch and at a temperature of —20° F., and stored for several days without involving any cost for refrigeration, and without any gas loss through the operation of the pressure relief valve.

Customers of liquid carbon dioxide usually receive the same confined in small cylinders, shells, drums, or cartridges, which hold a comparatively few pounds of carbon dioxide. The installation disclosed in Fig. 9 includes equipment for charging such small cylinders, etc.

Charging plants now in commercial use employ compressors designed to charge cylinders, or the like, with liquid carbon dioxide which is pumped from a container holding liquid carbon dioxide at atmospheric temperatures and at pressures usually in excess of 1000 pounds per square inch. This liquid is customarily expanded through an expansion valve and enters the cylinder of the compressor where it is compressed to high pressures with an accompanying temperature rise which is considerable and then must be reliquefied by removal of the heat units which were introduced to the fluid by the compression in the compressor cylinder. A considerable amount of power is needed to operate such a compressor.

In the installation shown in Fig. 9, a pumping unit 100 is employed and, preferably, is operated by an electric motor 101. The details of this unit 100 are shown in Fig. 16 and will be more completely described in connection therewith. It will be stated at this time, however, that the pumping unit 100 takes the form of a reciprocating plunger type of compressor, which will function to receive the liquid carbon dioxide from the storage container of the assembly 86 and deliver the carbon dioxide, still in a liquid state, at an elevated pressure with no appreciable increase in the temperature of the said liquid. This method of transferring liquid carbon dioxide is believed to be new with this invention. For example, in a typical installation, such as that disclosed in Fig. 9, the liquid pump 100 will receive the liquid carbon dioxide at a pressure of 300 pounds per square inch and at a temperature of 0° F. from the storage container or containers and raises the pressure to any desired pressure ranging from 800 pounds to 1500 pounds per square inch, depending upon the use to which the liquid is to be put. During this operation, the liquid remains at approximately 0° F.

The suction side of the pumping unit 100 is connected by the pipe 102 with the lower portion or portions of the individual storage containers of the assembly 86. The discharge side of the unit 100 may be connected by the pipe 103 with a receiver 104. The receiver may or may not be insulated, as desired. A suitable number of charging heads or clamps 105 are connected to the receiver 104 by the pipe line 106.

When charging of cylinders, or the like, takes place, or when the apparatus is operating to charge cylinders, it is desirable to continuously operate the pumping unit 100. During such periods of operation, occasions may arise when no cylinders are connected to the charging heads or clamps 105. To prevent the building up of an excessive hydrostatic pressure in the receiver 104, a pressure relief or blow-off valve of the type disclosed in detail in Fig. 17, is connected in the pipe line 103, as indicated at 107. This pressure relief valve 107 is permanently connected to the top or tops of the individual storage containers by means of the pipe line 108.

To further explain the operation of this charging equipment, the receiver 104 is constantly supplied with liquid carbon dioxide by means of the unit 100 with the liquid carbon dioxide being at the elevated pressure required for the particular use and at the low temperature maintained in the storage containers. When a cylinder, or the like, is placed in communication with the receiver 104 by means of one of the charging heads or clamps 105, the pressure in the receiver 104 drops 200 or 300 pounds immediately. The pumping unit 100, however, quickly builds the pressure in the receiver 104 back up again to the desired working pressure. This working pressure preferably is approximately 1000 pounds per square inch. If the next succeeding cylinder, or the like, is not ready for charging by the time the first cylinder is charged and disconnected, and the pressure within the receiver 104 builds up to the predetermined relief pressure of the relief valve 107, this valve will function to establish communication between the pipe 103, leading from the pumping unit 100, and the storage container or containers. It will be impossible, therefore, for an excessive hydrostatic pressure to be built up should all of the charging clamps or heads 105 be closed while the unit 100 is in operation.

Due to the low pressure at which the liquid carbon dioxide is handled by the pumping unit 100, the reciprocating plunger type of compressor unit 100, shown in detail in Fig. 16, may be employed to raise the pressure of the liquid from that of the storage container or containers to that required in the charging clamps or heads without raising the temperature. If the pumping unit 100 consisted of a compressor which handled the carbon dioxide in a gaseous state, it would be impossible to effect charging of the cylinders, or the like, by means of such a unit without input of heat. Pumping and boosting the pressure of the carbon dioxide while in a liquid state by the unit 100 avoids the input of heat and permits the unit to be operated at a much lower rate of power consumption.

For example, at least one cylinder charging plant which has been in operation for several years to charge cylinders by means of a compressor handling the carbon dioxide in a gaseous state has been converted to a charging plant of the type described in connection with Fig. 9. This charging plant formerly required 60 horsepower to operate it when it compressed the carbon dioxide in a gaseous state. This same plant, when converted, now operates on 15 horsepower, and it has been found to be capable of charging a considerably larger number of cylinders, or the like, than was possible with the 60 horsepower equipment. This may be explained by the fact that the weight of carbon dioxide gas entering a gas compressor cylinder at 300 pounds per square inch suction pressure is 3½ pounds per cubic foot while the weight of liquid carbon dioxide entering the same cylinder at the same pressure is about 64 pounds per cubic foot. Thus, the output from a given sized compressor cylinder is increased twenty-fold when the unit handles liquid instead of gaseous carbon dioxide. This can be achieved by omitting the expansion valve in the suction line, thus maintaining the flooded suction condition in the compressor intake. It also has been found to be desirable to increase the compressor valve lift and clearance.

In Fig. 10, there is disclosed a modified form of refrigerating apparatus for a storage container assembly which is designated by the reference character 86a. This modified refrigerating apparatus extracts heat from the liquid carbon dioxide exteriorly of the said storage assembly.

A rotary liquid pump unit diagrammatically illustrated at 109 is connected to the storage container or containers of the assembly 86a by a pipe line 110. The discharge of the pump unit 109 is connected by a pipe 111 with a tube type of heat exchanger diagrammatically illustrated at 112. The refrigerated liquid carbon dioxide is returned to the storage space or spaces of the containers constituting the unit 86a through the pipe line 113. The heat exchanger 112 is provided with conventional headers 114 and 115 which are interconnected by conventional tubes passing through the central portion of the exchanger. The header 114 is connected by a pipe 116 to the intake of the compressor 117 which forms a part of a standard commercial refrigerator unit. The discharge of the compressor 117 is connected by the pipe 118 with an air cooled condenser coil 119. The remaining end of this coil is connected to a receiver 120. A pipe 121 forms communication between the receiver 120 and the header 115 of the heat interchanger.

It is to be understood that this storage container assembly 86a is to be provided with one or more safety valves 99 in the same manner as that described in connection with the storage assembly 86 of Fig. 9. Suitable cylinder charging equipment of the character disclosed in Fig. 9 also may be coupled with the storage container assembly 86a in any suitable manner, for example, by means of the branch pipe lines 122 and 123.

In connection with Fig. 9, there was disclosed one method and type of apparatus which may be employed for effecting transfer of the low temperature, low pressure liquid carbon dioxide from the container of a transport unit to the container or containers of a stationary storage unit. In Fig. 7, there is disclosed a further form of apparatus which may be employed. In this figure there is illustrated an insulated stationary storage unit 124 which is intended to receive low temperature, low pressure liquid carbon dioxide from the transport unit 47. The lower portions of the containers for both of the units 47 and 124 are placed in communication with each other by means of the pipe line 125 which is provided with a conventional form of quick detachable coupling 126. The upper portions of the containers for the units 47 and 124 are connected by a pipe line 127 which has interposed therein a gas compressor 128 and a heat exchange unit 129 which includes a coil 130 connected in series with the pipe line 127 and a steam heated water bath 131.

When it is desired to effect transfer of the low temperature, low pressure liquid carbon dioxide from the container of the unit 47 to the container or containers of the assembly 124, the pipe lines 125 and 127 are properly coupled with the unit 47, as illustrated. The gas compressor 128 is operated and functions to remove carbon dioxide gas from the upper portion of the insulated container or containers of the assembly 124. This cold carbon dioxide gas handled by the compressor 128 is passed through the coil 130 which heats the said gas. This heated gas which, of course, has been raised in pressure as well as in temperature, is forced into the container of the transport unit 47. This high pressure, high temperature gas creates a pressure differential which causes the liquid carbon dioxide to flow at a rapid rate through the pipe line 125 from the container of the transport unit 147 to the container or containers of the stationary storage assembly 124.

The description of the methods and apparatus of Figs. 7 and 9, which relate to transferring low temperature, low pressure liquid carbon dioxide from the transport unit 47 to stationary storage containers, clearly point out that the container portion of the transport unit 47 is charged with carbon dioxide gas during the withdrawal of the liquid carbon dioxide. This gas remains in the transport container until a new charge of low temperature, low pressure liquid carbon dioxide is placed therein, as is shown in Fig. 1. This gas pressure in the transport container prevents the pressure of the liquid carbon dioxide fed to the container when the latter is charged, for example, through the pipe 37 in Fig. 1, from dropping below the pressure at which the liquid carbon dioxide will flash and form snow, which pressure is approximately 75 pounds per square inch.

In Figs. 2 and 9, there are disclosed stationary storage containers which are provided with cooling coils 80 and 91 that are coupled with refrigerating apparatus and which are located in the said containers at a level which will submerge the said coils in the liquid carbon dioxide bath contained within the containers. In Figs. 7 and 8, there is disclosed a modified form of cooling coil for the stationary storage containers. The dome portion 132 of the storage container has positioned therein a cooling coil 133 which is connected by the branches 134 and 135 in circuit with refrigerating apparatus of the type illustrated in Fig. 9. Fig. 7 discloses the use of an expansion valve 136 in the branch line 135.

This type of cooling coil has been found to effect appreciable economies in maintaining the low temperature, low pressure liquid carbon dioxide stored in the container at its desired low values. As heat penetrates the insulation surrounding the container, some liquid carbon dioxide evaporates and the gases or vapors rise therefrom into the interior of the dome 132. These carbon dioxide gases or vapors contact with the surface of the cooling coil 133 and condense. The drops of condensation are returned by gravity to the liquid bath within the container. It readily will be appreciated that the total surface area of a cooling coil of this character may be much less than the surface required in a coil of the character disclosed in either of the containers 81 and 86 of Figs. 2 and 9.

In Figs. 3 to 5, inclusive, there is disclosed in detail a preferred form of transport unit which may be employed for conveying the low temperature, low pressure liquid carbon dioxide from a producing plant, or other source of supply, to a distribution plant. Figs. 3 and 4 disclose the heavily insulated container unit as being mounted on a trailer 137 which may be of any suitable design which is capable of carrying the load. The actual container 138 is secured to the chassis of the trailer 137 by means of proper tiedown bolts 139 which are suitably located and effectively connected to the chassis of the trailer and the side walls of the container 138. Suitable layers of cork insulating material 140 are arranged to surround and enclose the periphery of the container 138. The forward closed end of the container also is covered by properly fitted plies or layers of insulating material 141. A suitably shaped disc of insulating material 142 is fitted in place to properly close off the rear end of the insulated space. Ground cork, or the like, 143, may be employed for filling in the angles.

In Figs. 4 and 5, the container 138 is illustrated as being provided with a suitable number of baffle plates 144 which are arranged to permit uninterrupted communication between all portions of the interior of the container 38 both above and below these baffles. For the purpose of permitting the attendant of the transport unit to ascertain the quantity of liquid carbon dioxide within the container 138, a float 145 is mounted in the container on the float carrying arm 146. A mounting shaft 147 extends outwardly through the side wall of the container 138 and the insulating plies 140 to receive at its outer end a pointer or indicator arm 148 which is associated with a quadrant type of scale or gauge 149. The position of the pointer or indicator 148 with respect to the graduations, not shown, on the gauge plate 149 will indicate the position of the float 145 within the container.

A pressure gauge 150 may be properly associated with the forward end of the container 138 if desired. A pump 87, see Fig. 9, is connected to the lower portion of the container 138 by means of the pipe line 88. A portion of the pipe line 90, employed for establishing communication between the upper portion of the container 138 and the upper portion of a stationary storage container, also is illustrated.

Figs. 3 and 4 disclose the dome portion 150' of the container 138 as having associated therewith a main pop-off or relief valve 151 and one or two additional safety relief valves 152.

Fig. 6 discloses the main pop-off or relief valve 151 in detail. This pop-off valve includes a main casing body 153 which is provided with an internally threaded part 154 which should be connected with a nipple, or the like, extending into and communicating with the interior of the container 138. A suitable discharge port 155 for the valve body 153 is provided by the nipple 156 which has formed at its inner end a valve seat 157 to receive the ball valve 158. This ball valve is properly connected with a stem 159 which in turn is connected with a diaphragm 160 secured to the flanged end 161 of the valve housing 153 by the flanged end 162 of a casing part 163. This casing part enclosed a heavy spring 164 employed to load the valve 158 so as to maintain this valve seated until a rise in pressure within the container 138 functions to overcome the load of the spring 164 and thereby unload and unseat the valve 158. The pressure within the container 138 naturally acts upon the face of the diaphragm 160 which is exposed to the interior of the valve housing 153.

For the purpose of varying the pressure at which the load of the spring 164 will be overcome, a follower 165 bears against the outer end of the spring and is adjustably positioned by means of the set screw or bolt 166. This bolt should be properly adjusted to provide the desired pop-off pressure for the container 138 and then should be sealed by the element 167 to prevent unauthorized tampering with the same.

In Figs. 11 and 12, there is disclosed in detail the construction of a preferred form of individual storage container. This container consists of a tubular shell 170 which is welded at one end to a solid head 171 and is welded at its other end to a ring 172. The central opening of the ring 172 is closed by a cover 173 secured in place by means of a suitable number of stud bolts 174.

The evaporator coil 80 or 91, see Figs. 2 and 9, has two branches extending through suitable openings formed in the end cover 173. Suitable transversely extending coil supports 175 are mounted in the shell 170, as clearly illustrated in these two figures. Fig. 12 discloses a plurality of coupling members 176 which are welded in apertures formed in the shell 170 and are employed for establishing the desired connections between the interior of the shell and the other units disclosed and described in connection with Figs. 2 or 9.

In Figs. 13, 14 and 15, there is disclosed a storage assembly which includes two container units of the character disclosed in Figs. 11 and 12 and which are arranged side by side. These two container units are suitably tied together and are surrounded by insulating material which, preferably, consists of cork lagging units 177 covering the outer curved sides of the two tanks and the cork boards 178 which span the spaces between the two containers. Regranulated cork 179 may be employed for filling the spaces provided by the two containers and the cork boards 178. The ends of the containers and the spaces filled by the regranulated cork 179 may be covered by cork slabs 180 and 181. The slab 181, of course, is provided with suitable openings to receive the branches of the evaporator coils 91, see Fig. 15.

In Fig. 16, there is disclosed in detail the pumping and pressure boosting unit designated by the reference character 100 in Fig. 9. This unit consists of a conventional base casting 182 with a cylinder block 183 properly thereon. A reciprocating piston 185 is mounted in the cylinder 183 and is properly connected with a crank shaft 186 journaled in bearings carried by the base casting 182. The elements so far described are of conventional design and may be found in any standard commercially available air compressor.

The conventional cylinder head of the air compressor has been removed and the base 187 of a specially designed relatively small bore cylinder 188 substituted. This cylinder and base are clamped in position by suitable bolts and nuts of the character formerly employed for securing the conventional cylinder head in place. The upper end of the cylinder block 188 is flanged at 189 to have suitably secured thereto a cylinder head 190 of special design.

A pumping plunger 191 reciprocates within the bore of the cylinder 188 and is anchored at its lower end to the end wall 185' of the conventional piston 185 by means of the plate 192 and the securing devices 193. Packing material 194 is positioned within the cavity 195 formed in the cylinder 188 and is compressed by a packing gland 196. This packing gland may be adjusted by means of the bolts 197 and lock nuts 198 in the manner clearly illustrated.

The cylinder head 190 is suitably bored to receive the valve cap 199 to which the intake pipe 102, see Fig. 9, is connected. A valve seat 200 is arranged at the inner end of the valve cap 199 and is adapted to have a valve 201 seated thereagainst by means of the spring 202. The valve 201 will be unseated during the suction stroke of the plunger 191 to admit liquid carbon dioxide to the bore of the cylinder 188. Upon the return or compression stroke of the plunger, the spring 202 will seat the valve 201.

The discharge pipe 103, see Fig. 9, is connected to the second valve cap 203. The valve seat 204 is associated with the inner end of the valve cap 203 and is engaged by a valve 205 which is retained seated by the spring 86 during the suction stroke of the plunger 191. This valve 205 will be moved off of its seat during the compression stroke of the plunger.

The hydrostatic pressure relief valve 107, see Fig. 9, is disclosed in detail in Fig. 17. The coupling 207 is suitably connected in the pipe 103 and has connected thereto the casing section 208 by means of the nipple 209 mounted in one of the branches of the coupling 207. This casing section 208 has a valve seat 210 mounted therein and designed to be engaged by the ball valve 211.

A second valve casing part 212 is suitably threadedly connected to the first mentioned casing part 208 and functions to house a coil spring 213 which engages the spring seat 214 at one end and the spring seat 215 at its remaining end. The spring seat 214 bears against the ball valve 211 to retain this valve seated until a predetermined hydrostatic pressure is built up in the line 103. The spring 213 will be compressed by movement of the ball valve 211 away from its seat as the result of the development of an excessive hydrostatic pressure.

The spring seat 215 is engaged by the threaded shank 216 of an adjusting rod 217 which is provided with a suitable manipulating handle 218 at its outer end and passes through suitable packing 219 to prevent leakage around the stem. Adjustment of the stem 217 inwardly or outwardly, by rotation of the stem, will effect variations in the load applied to the ball valve 211 by the spring 213. By means of this adjustable stem, therefore, the hydrostatic pressure at which the ball valve 211 will be unseated may be varied.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, what we claim is:

1. A method of handling a liquefied gas which must be maintained above 75 pounds per square inch pressure to maintain it as a liquid comprising passing the gas through a plurality of stages of compression, cooling the gas after each stage of compression to remove the heat absorbed by the gas, condensing the compressed gas to obtain liquid, lowering the temperature and pressure of the liquid to a predetermined selected sub-atmospheric temperature and its corresponding vapor pressure, which will be above 75 pounds per square inch, and delivering said low temperature, low pressure liquid without change in temperature and pressure to an insulated container charged with a fluid at a pressure which will prevent the pressure of the incoming liquid from dropping below 75 pounds per square inch.

2. A method of handling a liquefied gas which must be maintained above 75 pounds per square inch pressure to maintain it as a liquid comprising passing the gas through a plurality of stages of compression, cooling the gas at each stage of compression to remove the heat absorbed by the gas, condensing the compressed gas to obtain liquid, refrigerating the liquid to lower the temperature and pressure of the same to a predetermined selected sub-atmospheric temperature and its corresponding vapor pressure, which will be above 75 pounds per square inch, and delivering said low temperature, low pressure liquid without change in temperature and pressure to an insulated container charged with a gas at a pressure which will prevent the pressure of the incoming liquid from dropping below 75 pounds per square inch.

3. A method of storing a liquefied gas which must be maintained above 75 pounds per square inch pressure to maintain it as a liquid which comprises the steps of charging an insulated pressure container with a liquefied gas at a sub-atmospheric temperature and its corresponding vapor pressure, and maintaining the liquid in said container at a constant sub-atmospheric temperature and its corresponding vapor pressure by condensing the vapors in the vapor space of the container and allowing the condensation to return to the liquid bath.

4. A method of storing and dispensing a liquefied gas which must be maintained above 75 pounds per square inch pressure to maintain it as a liquid which comprises the steps of charging an insulated pressure container of large capacity with a liquefied gas at a pre-selected sub-atmospheric temperature and its corresponding vapor pressure, maintaining the liquid in said container at approximately its charging sub-atmospheric temperature and pressure by condensing the vapors within the container, withdrawing the liquid from said container while maintaining the normal pressure in the container, and elevating the pressure of the withdrawn liquid while maintaining the temperature of the liquid at substantially the temperature prevailing in said pressure container.

5. A method of handing a low temperature, low pressure liquefied gas which must be maintained above 75 pounds per square inch pressure to maintain it as a liquid which comprises the steps of transferring from a transport container to an insulated storage container of large capacity a liquefied gas at a pre-selected sub-atmospheric temperature and its corresponding vapor pressure, maintaining the liquid at approximately the pre-selected sub-atmospheric temperature while stored in said insulated container, discharging the liquid from the storage container for use, and maintaining all of the liquid in the liquid phase and at approximately the same temperature during discharge while raising the pressure to a considerably higher value.

6. A method of handling a low temperature, low pressure liquefied gas which must be maintained above 75 pounds per square inch pressure to maintain it as a liquid which comprises the steps of confining in an insulated storage container of large capacity a liquefied gas at a pre-selected sub-atmospheric temperature and its corresponding vapor pressure, refrigerating the liquid while in the storage container at a rate sufficient to remove heat units absorbed by the liquid, transferring the liquid from the storage container to a receiver and simultaneously raising the pressure to a value considerably higher than the pressure of the stored liquid but without the addition of appreciable heat, and charging small cylinders, or the like, with the liquid at the high pressure and abnormally low temperature directly from said receiver.

7. Apparatus for handling low temperature, low pressure liquid carbon dioxide comprising a large capacity insulated storage container, means for charging said container with liquid carbon dioxide at a predetermined sub-atmospheric temperature and its corresponding vapor pressure, means for condensing the vapor in the vapor space of the container to maintain the stored liquid carbon dioxide at said predetermined temperature and pressure, and means for receiving the liquid carbon dioxide from the storage container and compressing it to a pressure appreciably higher than the storage pressure while maintaining the temperature of the liquid substantially at the charging temperature, while being compressed.

8. Apparatus for handling low temperature, low pressure liquid carbon dioxide comprising an insulated transport container, a large capacity insulated storage container, pipe lines connecting the upper and lower portions of said containers to effect transfer of gaseous and liquid carbon dioxide respectively, a compressor in series with the pipe line connecting the upper portions of said containers, and means for heating the carbon dioxide gas fed from the compressor into the transport container.

9. Apparatus for handling low temperature, low pressure liquid carbon dioxide comprising a transport container, a large capacity insulated storage container, a rotary pump having a low pressure differential between its suction and discharge sides connected with said containers for transferring liquid carbon dioxide from the transport container to the storage container with the carbon dioxide at a pre-selected sub-atmospheric temperature and its corresponding pressure, and means for equalizing the vapor pressure in the two containers during transfer of the liquid.

10. In combination, a large capacity pressure container, an insulating jacket surrounding said container, said container being adapted to be charged with liquid carbon dioxide at a pre-selected sub-atmospheric temperature and its corresponding vapor pressure, a receiver, means for conducting liquid carbon dioxide from the storage container to the receiver, a reciprocating piston type compressor, having a flooded suction intake, connected in the conducting means for pumping liquid carbon dioxide from the storage container to the receiver and for simultaneously raising its pressure to a value appreciably above the storage pressure while allowing the temperature of the liquid to remain substantially constant, means comprising a relief valve and a pipe line leading to the container for preventing the building up of an excessive hydrostatic pressure in said receiver, and a plurality of cylinder charging clamps connected to the receiver.

11. A method of handling a liquefied gas which must be maintained above 75 pounds per square inch pressure to maintain it as a liquid, comprising converting the gas to a liquid and lowering the temperature and pressure to a predetermined selected sub-atmospheric temperature and its corresponding vapor pressure, which will be above 75 pounds per square inch, delivering said low temperature, low pressure liquid to an insulated container without change in temperature and pressure, and controllably maintaining the liquid at said low temperature and pressure while confined in said container by condensing the vapors in the vapor space of the container.

12. A method of handling a liquefied gas which must be maintained above 75 pounds per square inch pressure to maintain it as a liquid, comprising converting the gas to a liquid and lowering the temperature and pressure to a predetermined selected sub-atmospheric temperature and its corresponding vapor pressure which will be above 75 pounds per square inch, charging said low temperature, low pressure liquid into an insulated transport container of large capacity having a gas charge which will maintain the pressure of the incoming liquid above 75 pounds per square inch, maintaining said liquid at substantially the selected low charging temperature and pressure during transportation, transferring the liquid from the transport container to a stationary storage container of several hundred pounds capacity without change in temperature and pressure and while charging the transport container with gas taken from the storage container to be used in refilling the transport container, and controllably maintaining said liquid at said low temperature and pressure while in storage and while retaining both the liquid and its vapor in said storage container.

13. A method of handling a liquefied gas which must be maintained above 75 pounds per square inch pressure to maintain it as a liquid, comprising converting the gas to a liquid and lowering the temperature and pressure to a predetermined selected sub-atmospheric temperature and its corresponding vapor pressure, which will be above 75 pounds per square inch, charging said low temperature, low pressure liquid into an insulated transport container of large capacity having a gas charge which will maintain the pressure of the incoming liquid above 75 pounds per square inch, maintaining said liquid at substantially the selected low charging temperature and pressure during transportation, transferring the liquid from the transport container to an insulated storage container of large capacity without changing temperature and pressure while charging the transport container with gas from the storage container, controllably maintaining said liquid at said low temperature and pressure while in storage, discharging the liquid from the storage container, and maintaining all of the liquid in the liquid phase and at the same temperature during discharge while raising the pressure to a considerably higher value.

14. A method of handling a liquefied gas which must be maintained above 75 pounds per square inch pressure to maintain it as a liquid, comprising converting the gas to a liquid having a predetermined selected sub-atmospheric temperature and its corresponding vapor pressure, which will exceed 75 pounds per square inch, by lowering the temperature of the gas and converting the gas to a liquid, delivering said low temperature, low pressure liquid to an insulated container without change in temperature and pressure, and controllably maintaining the liquid at said low temperature and pressure while confined in said container by condensing the vapors in the vapor space of the container.

15. A method of handling a liquefied gas which must be maintained above 75 pounds per square inch pressure to maintain it as a liquid, comprising converting the gas to a liquid having a predetermined selected sub-atmospheric temperature and its corresponding vapor pressure, which will not exceed 75 pounds per square inch, by lowering the temperature of the gas and converting the gas to a liquid, delivering said low tempertaure, low pressure liquid into an insulated transport container of large capacity having a gas charge which will maintain the pressure of the incoming liquid above 75 pounds per square inch, maintaining said liquid at substantially the selected low charging temperature and pressure during transportation, transferring the liquid from the transport container to a stationary storage container of several hundred pounds capacity without change in temperature and pressure and while charging the transport container with gas, taken from the storage container, which is used as the aforementioned gas charge in refilling the transport container, and controllably maintaining said liquid at said low temperature and pressure while in storage and while retaining both the liquid and its vapor in said storage container.

16. A method of handling a liquefied gas which must be maintained above 75 pounds per square inch pressure to maintain it as a liquid, comprising converting the gas to a liquid having a predetermined selected sub-atmospheric temperature and its corresponding vapor pressure, which will exceed 75 pounds per square inch, by lowering the temperature of the gas and converting the gas to a liquid, charging said low temperature, low pressure liquid into an insulated transport container of large capacity having a gas charge which will maintain the pressure of the incoming liquid above 75 pounds per square inch, maintaining said liquid at substantially the selected low charging temperature and pressure during transportation, transferring the liquid from the transport container to an insulated storage container of large capacity without changing temperature and pressure while charging the transport container with gas taken from the storage container, controllably maintaining said liquid at said low temperature and pressure while in storage, discharging the liquid from the storage container, and maintaining all of the liquid in the liquid phase at the same temperature during discharge while raising the pressure to a considerably higher value.

17. A method of handling a liquefied gas which must be maintained above 75 pounds per square inch pressure to maintain it as a liquid, comprising charging said liquefied gas at a preselected sub-atmospheric temperature and its corresponding vapor pressure, which will be above 75 pounds per square inch, into an insulated transport container of large capacity which has at the time of charging a gas charge which will maintain the pressure of the incoming liquefied gas at a pressure above 75 pounds per square inch, maintaining said liquid at substantially its charging temperature and pressure during transportation, and effecting discharge of said low temperature, low pressure liquefied gas at its point of destination, said discharging operation resulting in leaving said transport container with a gas charge to be used in the aforesaid manner when the container is again recharged with liquefied gas.

ERIC GEERTZ.
JESSE E. TAYLOR.

CERTIFICATE OF CORRECTION.

Patent No. 2,180,231.　　　　　　　　　　　　　　　November 14, 1939.

ERIC GEERTZ, ET AL.

It is hereby certified that the above numbered patent was erroneously issued to "Cardox Corporation" as assignee of the entire interest therein, whereas said patent should have been issued to the inventors, Eric Geertz and Jesse E. Taylor, said Geertz, assignor to Cardox Corporation, of Chicago, Illinois, a corporation of Illinois, as shown by the record of assignments in this office; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.